United States Patent [19]

Etherton et al.

[11] Patent Number: 5,756,611
[45] Date of Patent: May 26, 1998

[54] α-OLEFIN POLYMERIZATION CATALYSTS

[75] Inventors: Bradley P. Etherton, Houston, Tex.; Ramesh Krishnamurti; John A. Tyrell, both of Williamsville, N.Y.; Sandor Nagy, Grand Island, N.Y.

[73] Assignee: Lyondell Petrochemical Company, Houston, Tex.

[21] Appl. No.: 803,003

[22] Filed: Feb. 21, 1997

[51] Int. Cl.$^6$ ............................................. C08F 4/64
[52] U.S. Cl. ..................... 526/127; 502/104; 502/111; 502/117; 502/152; 502/155; 502/200; 502/202; 502/211; 526/132; 526/160; 526/348.6; 526/352; 526/943
[58] Field of Search ........................ 502/104, 111, 502/117, 152, 155, 200, 202, 211; 526/127, 132, 160, 348.6, 352, 943

[56] References Cited

U.S. PATENT DOCUMENTS 5,543,377  8/1996  Tsutsui et al. ......................... 502/125

*Primary Examiner*—David W. Wu
*Attorney, Agent, or Firm*—Liddell, Sapp, Zivley, Hill & LaBoon L.P.

[57] ABSTRACT

A catalyst useful in the polymerization of α-olefins comprises the reaction product of an alcohol having the general formula

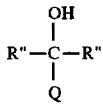

with an organometallic compound having the general formula $$LM(X)_{v-1}$$

wherein Q is $-COR^{12}$, $-CR"R"(OR^{12})$ and $-CR"R"N(R")_2$;

wherein each R" is independently selected from H and R, R is a $C_1$ to $C_{12}$ alkyl group or a $C_6$ to $C_{24}$ aryl group, $R^{12}$ is R or a radical of the formula $-(CH_2)_w-O-(CH_2)_y-H$, w and y being independently selected from 1 to 4;

L is a π-bonded ligand selected from (i.) a cyclopentadienyl or substituted cyclopentadienyl ring; (ii.) a boraaryl ring; (iii) a 1,2-azaborolinyl ring; or (iv.) a 5-membered heterocyclic ring;

M is a Group 3 to 7 metal of the Periodic Table;

v is the valence of M; and each X is independently selected from halogen or a $C_1$–$C_6$ alkyl group or a $C_6$–$C_{24}$ aryl group.

29 Claims, No Drawings

5,756,611

α-OLEFIN POLYMERIZATION CATALYSTS

FIELD OF THE INVENTION

The invention relates to novel catalysts and the use of the catalysts in the polymerization of α-olefins. The invention further relates to a method of making the catalysts. The catalysts of the invention are reaction products of an alcohol having the general formula

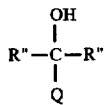  (I)

and an organometallic compound of the formula $LM(X)_{v-1}$  (II)

wherein Q is —COR$^{12}$, —CR"R"(OR$^{12}$) or —CR"R"N(R")$_2$;

each R$^{12}$ is R or a radical of the formula —(CH$_2$)$_w$—O—(CH$_2$)$_y$, H, w and y being independently selected from 1 to 4;

each R is independently selected from a C$_1$ to C$_{12}$ alkyl group or a C$_6$ to C$_{24}$ aryl group; each R" is independently selected from H and R$^{12}$; L is a π-bonded ligand selected from (i.) a cyclopentadienyl or substituted cyclopentadienyl ring;
(ii.) a boraaryl ring;
(iii.) a 1,2-azaborolinyl ring; or
(iv.) a 5-membered heterocyclic ring M is a Group 3 to 7 metal;

each X is independently selected from hydrogen, halogen, a C$_1$-C$_6$ alkyl group or a C$_6$-C$_{24}$ aryl group; and v is the valence of M.

BACKGROUND OF THE INVENTION

Metallocene catalysts are a new class of catalysts gradually replacing Ziegler catalysts for the polymerization of olefins, such as ethylene and propylene. A metallocene catalyst typically consists of a transition metal compound bonded to at least one ligand that contains a cyclopentadienyl ring. While such catalysts are more expensive than Ziegler catalysts, they are much more efficient. Recently, catalysts containing boraaryl, azaborolinyl and pyrroyl rings have been proposed as alternatives to cyclopentadienyl rings.

Metallocene catalysts exhibit high activity when used in combination with aluminoxane co-catalysts. Alpha-olefin comonomers are further incorporated very well into the resultant polyolefins when such co-catalysts are employed. At higher operating temperatures, metallocene catalysts tend to produce lower molecular weight polymers. Thus, while they are useful for gas phase and slurry polymerizations of ethylene, conducted at about 70° to about 95° C., such catalysts generally do not work well in solution polymerizations of ethylene. The polymerization of ethylene in solution is desirable because it allows great flexibility for producing polymers over a wide range of molecular weights and densities as well as the use of a large variety of different comonomers.

SUMMARY OF THE INVENTION

The invention relates to novel metallocene-type catalysts of high activity which are easy to produce and which render high molecular weight polyolefins. Such polyolefins may be produced using solution polymerization techniques. The catalyst comprises the reaction product of an alcohol and an organometallic compound. The catalyst of the invention has a high degree of thermal stability. The enhanced thermal stability makes the catalysts suitable for use at higher temperatures, such as in the solution polymerization of α-olefins. The melt flow ratio (MFR) of the resulting polyolefins is low, which indicates that the polyolefins have a narrow molecular weight distribution even at a melt index as low as 0.03 dg/min. Furthermore, the activity of the catalyst of the invention is very high even at elevated temperatures. These are unusual properties for a metallocene-type catalyst.

DESCRIPTION OF THE PREFERRED EMBODIMENTS

The catalyst is the reaction product of an alcohol with an organometallic compound. The alcohol has the general formula

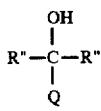  (I)

wherein Q is —COR$^{12}$, —CR"R"(OR$^{12}$) and CR"R"N(R")$_2$;

and further wherein R$^{12}$ is R or a radical of the formula —(CH$_2$)$_w$—O—(CH$_2$)$_y$, H; w and y being independently selected from integers of 1 to 4;

R is a C$_1$ to C$_{20}$ aliphatic group, preferably a C$_1$-C$_6$, most preferably a C$_1$-C$_4$ alkyl group, or a C$_6$ to C$_{24}$ aryl group including alkyl substituted aryl groups; each R" is independently selected from H and R$^{12}$.

In particular, the alcohol can have one of the following three formulas:

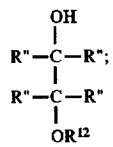  (III)

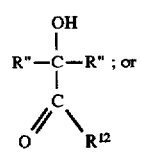  (IV)

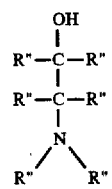  (V)

These β-substituted alcohols can be called β-alkoxy alcohols, β-keto alcohols, and β-amino alcohols, respectively. In the formulas, R" and R$^{12}$ are preferably independently selected from a C$_1$ to C$_4$ alkyl group for the β-keto and β-amino alcohols. For the β-alkoxy alcohols, R" and R$^{12}$ are preferably independently selected from a C$_1$ to C$_4$ alkyl group or is of the formula —(CH$_2$)$_w$O(CH$_2$)$_y$, H. Particularly preferred as the C$_1$-C$_4$ alkyl groups are methyl and ethyl. Examples of other preferred aliphatic groups include propyl, n-butyl and isopropyl.

The β-keto alcohols are most preferred as they exhibit higher productivity, higher activity at high temperatures and demonstrate the capability to render polymers having narrow molecular weight distribution over a wide range of average molecular weights.

The organometallic compound that is reacted with the β-substituted alcohol is of the general formula $LM(X)_{v-1}$ where L is a π-bonded ligand selected from (i.) a cyclopentadienyl or substituted cyclopentadienyl ring, Cp, such as those of the formula:

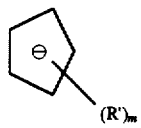
(VI)

wherein each R' is independently selected from hydrogen, halogen (preferably-Cl or Br), silyl such as —Si(CH$_3$)$_3$, germyl, cyano, R$_6$ or OR$_6$ wherein R$_6$ is a C$_1$ to C$_{20}$ hydrocarbyl group, such as alkyl, alkenyl, aryl, alkylaryl or arylalkyl, preferably a C$_1$ to C$_6$ group, or two carbon atoms are together to form a C$_4$–C$_6$ ring, and m, representing the number of substituent groups on the ring, is an integer from 1 to 5. Representative of fused rings are indenyl, tetrahydroindenyl and fluorenyl rings;

(ii.) a boraaryl derivative containing the unit:

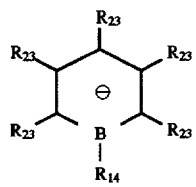
(VII)

(iii.) a 1,2-azaborolinyl ring of the formula:

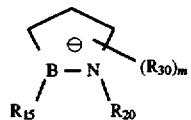
(VIII)

(iv.) a 5-membered heterocyclic ring of the structure

$[E_k(CR^{16})_{5-k}]^-$ (IX)

wherein each R$_{14}$ is independently selected from R$_{15}$ or R$_{10}$, R$_{10}$ being —OR or a radical of the formula:

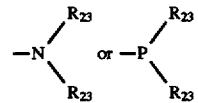

R$_{15}$ is R$_{22}$ or Si(R)$_3$;

R$_{20}$ is R$_{15}$, halogen, hydrogen, COR, COOR, SOR, or SOOR;

R$_{30}$ is R$_{20}$, OR, N(R)$_2$, SR, or a fused ring system;

R$_{22}$ being independently selected from —R or forms a fused ring preferably one containing 4 to 6 carbon atoms;

R$_{23}$ is —H or R$_{22}$; and each E independently represents a trivalent atom selected from nitrogen, phosphorus, arsenic, antimony and bismuth;

k is an integer from 1 to 5;

each R$^{16}$ independently represents R$_{14}$, —COR, hydrogen, —SR, ⁻X or ⁻Si(R)$_3$;

v is the valence of M;

M is a Group 3 to 7 metal of the Periodic Table, preferably a Group 4, 5 or 6 metal, including zirconium, titanium, or hafnium; especially, zirconium; and each X is independently selected from hydrogen, halogen and a C$_1$ to C$_{20}$, preferably a C$_1$ to C$_6$, alkyl group or C$_6$–C$_{24}$, preferably a C$_6$ to C$_{12}$, aryl group.

The L group is preferably cyclopentadienyl or a substituted cyclopentadienyl ring, as these organometallic compounds are more readily available commercially and the resulting catalysts have good activity. Examples of the heterocyclic radical of the formula:

$[E_k(CR^{16})_{5-k}]^-$ (X)

include 2-methylpyrrolyl, 3-methylpyrrolyl, 2,5-dimethylpyrrolyl, 2,5-di-tert-butylpyrrolyl, aryl substituted pyrrolyl rings such as 2-phenylpyrrolyl, 2,5-diphenylpyrrolyl, indolyl and alkyl substituted indolyls of the formula:

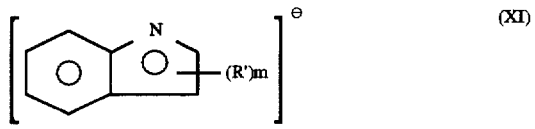
(XI)

such as 2-methylindolyl, 2-tert-butylindolyl, 3-butylindolyl, 7-methylindolyl, and 4,7-dimethylindolyl and carbazolyl and alkyl substituted carbazolyls of the formula:

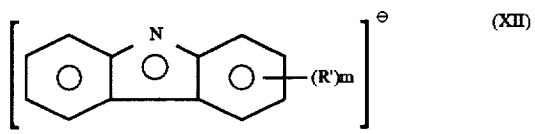
(XII)

In the formulas, each R' is preferably independently selected from hydrogen, alkyl from C$_1$ to C$_{10}$, and aryl from C$_6$ to C$_{10}$. (The alkyl and aryl substituents on the pyrrolyl ring-containing ligand are not on the nitrogen atom in the ring but are on the carbon atoms of the ring.)

Suitable reactants for use as the catalyst of the invention include:

(1-Phospha-2,3,4,5-tetramethylcyclopentadienyl) zirconium trichloride, (1-Phospha-2,3,4,5-tetramethylcyclopentadienyl) zirconium trimethyl, (1-Phospha-2,3,4,5-tetramethylcyclopentadienyl) zirconium tribenzyl, (1-Phospha-2,3,4,5-tetramethylcyclopentadienyl) zirconium methyldichloride, (1-Phospha-2,3,4,5-tetramethylcyclopentadienyl) zirconium trihydride, (1-Phospha-3,4-diphenylcyclopentadienyl)zirconium trichloride, (1-Phospha-3,4-diphenylcyclopentadienyl)zirconium trimethyl, (1-Phospha-3,4-diphenylcyclopentadienyl)zirconium tribenzyl, (1-Phospha-3,4-diphenylcyclopentadienyl)zirconium methyidichloride, (1-Phospha-3,4-diphenylcyclopentadienyl)zirconium trihydride, (1-Phospha-3,4-dimethylcyclopentadienyl)zirconium trichloride, (1-Phosphaindenyl)zirconium trichloride,
(1-Phospha-3-methoxycarbonylcyclopentadienyl) zirconium trichloride,
(1,3-Diphospha-4,5-diphenylcyclopentadienyl)zirconium trichloride,
(1,2,4-Triphospha-3,5-diphenylcyclopentadienyl) zirconium trichloride,
(1,2,3,4-Tetraphospha-5-phenylcyclopentadienyl) zirconium trichloride,
(Pentaphosphacyclopentadienyl)zirconium trichloride,
(1-Phospha-3-benzoyloxycyclopentadienyl)zirconium trichloride,
(Imidazolyl)zirconium trichloride,
(Imidazolyl)zirconium trimethyl,
(Imidazolyl)zirconium tribenzyl,
(Imidazolyl)zirconium methyldichloride,
(Imidazolyl)zirconium trihydride,
(Pyrazolyl)zirconium trichloride,
(1,2,3-triazolyl)zirconium trichloride,
(1,2,4-triazolyl)zirconium trichloride,
(Tetrazolyl)zirconium trichloride, and
(Pentazolyl)zirconium trichloride.

Alternatively L may contain a 1,2-azaborolinyl ring of the formula

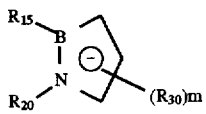
(XIII)

Ring systems fused to the 1,2-azaborolinyl ring typically contain four to six carbon atoms.

Examples of fused ring structures that can be used include:

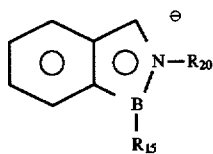
(XIV)

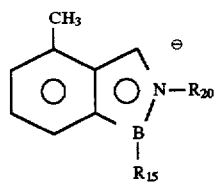
(XV)

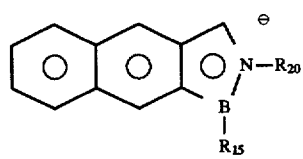
(XVI)

Examples of reaction products containing the 1,2-azaborolinyl ring include:
(1-tert-butyl-2-methyl azaborolinyl)zirconium trichloride,
(1-tert-butyl-2-ethyl azaborolinyl)zirconium trichloride,
(1-tert-butyl-2-phenyl azaborolinyl)zirconium trichloride,
(1-trimethylsilyl-2-methyl azaborolinyl)zirconium trichloride,
(1-trimethylsilyl-2-phenyl azaborolinyl)zirconium trichloride, and
(1-methyl-2-methyl azaborolinyl)zirconium trichloride.

In such formulations, the $R_{15}$ group is preferably alkyl from $C_3$ to $C_{12}$ or aryl, the $R_{20}$ group is preferably t-butyl or trimethylsilyl, and the $R_{30}$ group is preferably hydrogen or methyl.

Lastly, L may be a ligand containing a borabenzene ring. A borabenzene ring has the structure

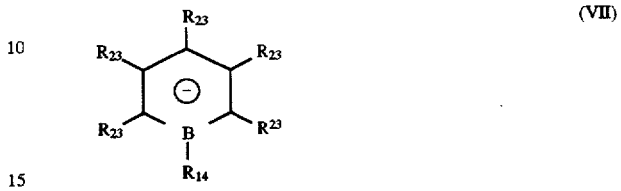
(VII)

Examples of such ligands include:

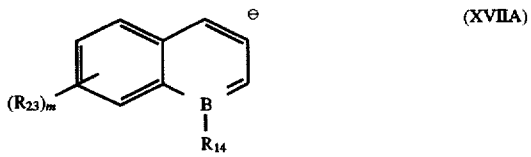
(XVIIA)

or

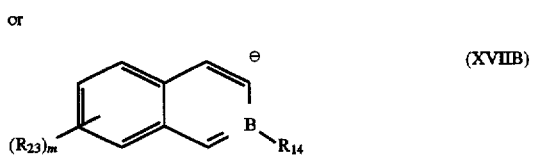
(XVIIB)

and

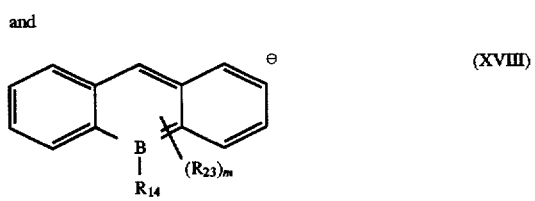
(XVIII)

referred to as boranaphthalenes and a boraanthracene, respectively.

Examples of reaction products for use in the invention containing borabenzene rings include:
(1-methyl borabenzene)zirconium trichloride,
(1-ethyl borabenzene)zirconium trichloride,
(1-tert-butyl borabenzene)zirconium trichloride,
(N,N-dimethyl-1-aminoborabenzene)zirconium trichloride,
(N,N-diethyl-1-aminoborabenzene)zirconium trichloride,
(9-mesityl-9-boraanthracene)zirconium trichloride,
(9-phenyl-9-boraanthracene)zirconium trichloride,
(9-methyl-9-boraanthracene)zirconium trichloride,
(9-ethyl-9-boraanthracene)zirconium trichloride,
(N,N-dimethyl-9-amino-9-boraanthracene)zirconium trichloride,
(N,N-diethyl-9-amino-9-boraanthracene)zirconium trichloride, and
(N,N-dimethyl-1-amino-3,5-dimethyl borabenzene) zirconium trichloride.

The catalysts of the invention are more preferably used in combination with a co-catalyst. Such co-catalysts (or activators) are any compound or component which can activate the catalyst. Representative co-catalysts include alumoxanes and aluminum alkyls of the formula $AlR_x(R_2)_{3-x}$ where $1 \leq x \leq 3$ and $R_2$ is hydrogen, halide, or alkyl or alkoxide having from 1 to 20 carbon atoms, such as triethyl aluminum, ethyl aluminum dichloride, trimethylaluminum and triisobutylaluminum. The alumoxanes may be represented by the cyclic formulae $(R^8\text{—Al—O})_s$ and the linear formula $R^8(R^8\text{—Al—O})_s AlR^8$ wherein $R^8$ is a $C_1$–$C_5$ alkyl group such as methyl, ethyl, propyl, butyl and isobutyl and s is an integer from about 3 to about 20. Preferably, $R^8$ is methyl and s is about 4. Representative but non-exhaustive examples of alumoxane co-catalysts are (poly)methylalumoxane (MAO), ethylalumoxane and diisobutylalumoxane.

The co-catalyst can further be a trialkyl or aryl (substituted or unsubstituted) boron derivative, such as perfluorotriphenylboron as well as an ionizing activator, neutral or ionic, or compounds such as tri (n-butyl) ammonium tetrakis (pentafluorophenyl) boron or trityl tetrakis(perfluorophenyl)boron which ionize the neutral metallocene compound. Such ionizing compounds may contain an active proton or some other cation associated with, but not coordinated to, or only loosely coordinated to the remaining ion of the ionizing compound. See, for instance, U.S. Pat. Nos. 5,153,157; 5,198,401; and 5,241,025, all of which are herein incorporated by reference.

Where a co-catalyst is used in combination with the catalyst, it is preferable to dissolve the catalyst in a solvent in which the co-catalyst is also soluble. For example, if MAO is the co-catalyst, then toluene, xylene, benzene, or ethylbenzene could be used as the solvent. The preferred co-catalyst is MAO as it results in high activity and a polymer having a narrower molecular weight distribution.

The mole ratio of organometallic co-catalyst to catalyst when used in a polymerization is generally in the range of 0.01:1 to 100,000:1; it preferably ranges from 1:1 to 1 0.000:1.

Where the co-catalyst is an alumoxane, the X group of the $LM(X)_{v-1}$ reactant is preferably chlorine. Where a boron containing co-catalyst is employed, the X group of the $LM(X)_{v-1}$ is preferably a $C_1$–$C_6$ alkyl group, most preferably methyl.

The alcohol can be reacted with the organometallic compound in a number of different ways to form the catalyst. Since either the alcohol or a salt of the alcohol will react with the organometallic compound, either can be used to form the catalyst reaction product.

The catalyst can be formed by first reacting the alcohol with a base that will react with the HX compound formed when the alcohol reacts with the organometallic compound, thereby shifting the equilibrium in the direction of the product. Tertiary amines can be used as a base in this reaction. Examples of suitable tertiary amines include benzyldiethylamine, triethylamine, trimethylamine; pyridine, dimethylaniline, triisopropylamine, and dimethylcyclohexylamine. Triethylamine is preferred because it is inexpensive, volatile, and easy to handle. The reaction proceeds at room temperature. The alcohol can also be reacted with a base that removes the hydrogen from the alcohol group, forming a salt which then reacts with the organometallic compound. Examples of suitable bases for this reaction include butyllithium, sodium hydride, potassium hydride, and metallic sodium, lithium, or potassium. Alkyl lithium compounds are preferred as they are readily available and easy to handle. This is the preferred reaction when the alcohol is a β-amino alcohol so that the amino group is not converted into an ammonium ion. The by-product formed by reaction with the base can be removed. For example, if the base is butyllithium and X is chlorine, then it will be preferred to remove lithium chloride.

Finally, to avoid contaminating the product with lithium chloride, after the base has removed the hydrogen on the alcohol, one can add a trialkyl chlorosilane, where each alkyl group is from $C_1$ to $C_4$. The trialkyl chlorosilane replaces the base with a trialkyl silane group. The base can then be removed before the organometallic compound is added. Examples of suitable trialkyl chlorosilanes that can be used include trimethylchlorosilane, ethyldimethylchlorosilane, triethylchlorosilane, and triisopropylchlorosilane. The preferred trialkyl chlorosilane is trimethylchlorosilane because it is readily available and volatile.

The first or last method should be used if the β-substituted alcohol is a β-keto alcohol, and preferably the first reaction is used for β-keto alcohols. All the reactions will proceed at room temperature and are complete in 1 to 20 hours. The reactions are facilitated by the presence of an aprotic solvent such as toluene, ether or tetrahydrofuran (THF), forming either a slurry or a solution. After the product has formed, the by-products are evaporated or filtered off and the solvent is evaporated to collect the product catalyst.

While not desiring to be bound by any particular theory, the reaction product is believed to be of the general formula:

(XIX)

No support is required for the catalyst, but a support, such as silica gel, alumina, silica, magnesia, or titania can be used if desired. Supports are not preferred as they may leave contaminants in the polymer. However, a support may be required, depending upon the process being utilized. For example, a support is generally needed in gas phase polymerization processes and slurry polymerization processes in order to control the particle size of the polymer being produced and in order to prevent fouling of the reactor walls. The support may also increase the thermal stability of the catalyst. To use a support, the catalyst and co-catalyst are dissolved in a solvent and are precipitated onto the support material by, for example, evaporating the solvent. The co-catalyst can also be deposited on the support or it can be introduced into the reactor separately from the supported catalyst.

The catalysts of the invention are useful in the production of homo- and co-polymers of olefins. Preferred as olefins are ethylene, propylene, butene, hexene and octene. Most preferred as olefin is ethylene. The catalyst is particularly useful in the production of copolymers of ethylene and unsaturated monomers such as 1-butene, 1-hexene, 1-octene; mixtures of ethylene and di-olefins such as 1,4-hexadiene, 1,5-hexadiene; and mixtures of olefins and unsaturated comonomers such as norbornene, aklylidene norbornenes such as ethylidene norbornene, and vinyl norbornene.

The catalyst systems of the invention are relatively homogeneous and, as such, are either liquids or are readily soluble in inert hydrocarbons. Such homogeneity offers greater control over the catalyst concentration. They can be utilized in a variety of different polymerization processes. For instance, they can be used in a liquid phase polymerization process (slurry, solution, suspension, bulk or a combination), a high pressure single phase process or gas phase polymerization process. The processes can be used in series or as individual single processes.

The pressure in the polymerization reaction zones can range from about 15 psia to about 50,000 psia. The temperature can range from about 40° C. to about 300° C. Gas phase and slurry polymerizations of olefins are typically conducted at about 70° C. to about 105° C. Solution, suspension and bulk phase polymerizations of olefins is normally conducted at temperatures of about 150° C. to about 300° C.

The catalysts of the invention further exhibit unusually high thermal stability, enabling their use over a very wide range of temperatures. In light of the homogeneity of the catalyst systems, they are particularly useful for the polymerization of olefins in solution phase.

EXAMPLES

The following examples will illustrate the practice of the present invention in its preferred embodiments. The examples are provided to illustrate the invention and not to limit it. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

Examples 1 to 5

The following describes the preparation of the catalyst used in Examples 1 to 5. To a slurry of 1.0 g (0.0038 mole) cyclopentadienyl zirconium trichloride in 40 ml toluene at room temperature was-added a solution of 0.384 g (0.0038 mole) triethylamine in 10 ml toluene. A solution of 0.616 g (0.0038 mole) di(ethylene glycol) butyl ether [$C_4H_9OC_2H_4OC_2H_4OH$] in 20 ml of toluene was added to this mixture with stirring at room temperature over a period of 15 minutes. The mixture was stirred two more hours at room temperature and then filtered to remove the triethylammonium chloride and any unreacted cyclopentadienyl zirconium trichloride. Toluene was removed from the filtrate in vacuo to yield 0.7 gram product.

Examples 6 to 10

The following describes the preparation of the catalyst used in Examples 6 to 10. To a slurry of 0.643 g (0.00245 mole) cyclopentadienyl zirconium trichloride in 40 ml diethylether at room temperature was added over a period of 1 hour a solution of 0.40 g (0.00245 mole) trimethylsilyloxy-2-ethoxyethane [$(CH_3)_3SiOC_2H_4OC_2H_5$] in 6.6 ml diethylether. The mixture was stirred four hours at room temperature and the volatiles removed in vacuo to yield 0.5 gram of a yellow solid.

Examples 11 to 15

The following describes the preparation of the catalyst used in Examples 11 to 15 and 21 to 23. To a solution of 0.927 g (0.0035 mole) cyclopentadienyl zirconium trichloride in 40 ml tetrahydrofuran at −78° C. was added a solution of 0.358 g (0.0035 mole) triethylamine in 10 ml THF. A solution of 0.312 g (.0035 mole) 3-hydroxy-2-butanone [$CH_3$—CHOH—CO—$CH_3$] in 20 ml of THF was added to this mixture with stirring at −78° C. The mixture was allowed to warm to room temperature and then stirred overnight at room temperature. The volatiles were removed in vacuo to concentrate the volume to 50% of the original volume and the mixture was then filtered. The volatiles were removed from the filtrate in vacuo and the solid residue was extracted with 40 ml of diethylether. The diethylether solution was removed from the undissolved solids via syringe. The diethylether removed in vacuo to obtain 0.16 g of solid catalyst.

Examples 16 to 20

The following describes the preparation of the catalyst used in Examples 16 to 20. To a slurry of 0.73 g (0.0028 mole) cyclopentadienyl zirconium trichloride in 40 ml THF at −78° C. was added a solution of the reaction product of 0.25 g (0.0028 mole) N,N-dimethylethanol [$HOC_2H_4N(CH_3)_2$] and 0.0028 mole butyllithium in 10 ml THF. Stirring was continued for 2 hours at −78° C. The mixture was allowed to warm to room temperature and was stirred overnight at room temperature. The volatiles were removed in vacuo to yield 0.8 gram solid catalyst.

Polymerizations

Ethylene was polymerized using the catalyst prepared in Examples 1 to 20. The polymerizations were conducted in a stirred 1.7 liter autoclave at 80° to 110° C. Dry, oxygen-free toluene (840 ml) was charged to a clean, dry, oxygen-free reactor. MAO from Ethyl Corporation (10wt% in toluene) was used in the polymerizations as a co-catalyst. The desired amount of MAO to give the ratio shown in Table 1 was added by syringe at 30° C. The reactor was heated to the desired temperature and sufficient ethylene was added to bring the reactor pressure to 150 psig. The reactor was allowed to equilibrate at the desired temperature and pressure. A solution of catalyst was prepared by dissolving 0.100 grams of product in 100 ml of toluene. The catalyst solution was injected into the reactor already at reaction conditions. The amount of solution needed to give the quantity of catalyst shown in Table 1 was used to start a polymerization. Ethylene flowed into the reactor as needed in order to keep the pressure constant at 150 psig as polymer was produced.

At the end of one hour, the ethylene flow was stopped. The reactor was opened and the polymer was filtered from the toluene. The product was dried overnight in a vacuum oven and weighed.

Table 1 gives the polymerization conditions and the polymer weight produced by the catalysts prepared in the examples.

TABLE 1

| Ex. No. | Catalyst Amount (m moles Zr) | Al/Zr | T (°C.) | $H_2$ Amount (m moles) | Butene-1 Amount (ml) | Polymer Weight (g) |
|---|---|---|---|---|---|---|
| 1 | 0.0144 | 625 | 80 | 0 | 0 | 63.4 |
| 2 | 0.0058 | 1560 | 80 | 0 | 0 | 46.2 |
| 3 | 0.0058 | 1560 | 110 | 0 | 0 | 39.2 |
| 4 | 0.0058 | 1560 | 110 | 10 | 0 | 42.6 |
| 5 | 0.0058 | 1560 | 110 | 10 | 20 | 50.2 |
| 6 | 0.0160 | 562 | 80 | 0 | 0 | 20.5 |
| 7 | 0.0064 | 1410 | 80 | 0 | 0 | 18.8 |
| 8 | 0.0016 | 5625 | 80 | 0 | 0 | 26.7 |
| 9 | 0.0016 | 5625 | 80 | 10 | 0 | 5.6 |
| 10 | 0.0016 | 5625 | 110 | 0 | 0 | 17.3 |
| 11 | 0.0065 | 1386 | 80 | 0 | 0 | 56.0 |
| 12 | 0.0016 | 5523 | 80 | 0 | 0 | 62.8 |
| 13 | 0.0016 | 5523 | 80 | 0 | 20 | 75.8 |
| 14 | 0.0016 | 5523 | 110 | 0 | 0 | 57.1 |
| 15 | 0.0016 | 5523 | 110 | 0 | 20 | 62.5 |
| 16 | 0.0067 | 1340 | 80 | 0 | 0 | 47.2 |
| 17 | 0.0017 | 5360 | 80 | 0 | 0 | 61.1 |
| 18 | 0.0017 | 5360 | 80 | 0 | 20 | 52.3 |
| 19 | 0.0017 | 5360 | 110 | 0 | 0 | 8.0 |
| 20 | 0.0017 | 5360 | 110 | 0 | 20 | 0 |
| 21 | 0.0024 | 3680 | 110 | 0 | 0 | 54.4 |
| 22 | 0.0024 | 3680 | 110 | 10 | 20 | 77.5 |
| 23 | 0.0024 | 3680 | 110 | 20 | 20 | 79.6 |

Table 2 gives the productivity and the polymer properties for the catalysts prepared in the examples.

Polymer Properties

The melt index of the polymer was measured according to ASTM D-1238, Condition E and Condition F. $MI_2$ is the melt index measured with a 2.16 kg weight (Condition E). $MI_{20}$ is the melt index measured with a 21.6 kg weight (Condition F). MFR is the ratio of $MI_{20}$ to $MI_2$. The polymer density was measured according to ASTM D-1505.

TABLE 2

| Ex. No. | Catalyst Productivity (kg/g Zr/hr) | $MI_2$ (dg/min) | $MI_{20}$ (dg/min) | MFR | Density (g/ml) |
|---|---|---|---|---|---|
| 1 | 48.3 | 0.021 | 0.46 | 21.3 | — |
| 2 | 87.9 | 0.059 | 0.97 | 16.5 | 0.9536 |
| 3 | 74.6 | 0.31 | 4.09 | 13.3 | 0.9614 |
| 4 | 81.0 | 2.24 | 47.7 | 21.3 | 0.9692 |
| 5 | 95.4 | 3.23 | 71.6 | 22.2 | 0.9490 |
| 6 | 14.0 | 0.030 | 2.01 | 66.1 | — |
| 7 | 32.3 | 0.047 | 1.83 | 38.9 | — |
| 8 | 183 | 0.035 | 0.41 | 11.7 | — |
| 9 | 38.4 | 232 | — | — | — |
| 10 | 118 | — | — | — | — |
| 11 | 94.4 | 0.089 | 1.50 | 16.8 | — |
| 12 | 423 | 0.031 | 0.74 | 24.2 | — |
| 13 | 510 | — | — | — | — |
| 14 | 384 | 0.071 | 10.3 | 14.5 | — |
| 15 | 421 | 1.39 | 24.0 | 17.2 | — |
| 16 | 76.9 | — | — | — | — |
| 17 | 399 | — | — | — | — |
| 18 | 341 | 0.37 | 4.36 | 11.7 | — |
| 19 | 52.3 | — | — | — | — |
| 20* | 0 | — | — | — | — |
| 20 | 251 | 0.49 | 7.98 | 16.3 | 0.9582 |
| 21 | 358 | 5.45 | 114 | 20.9 | 0.9468 |
| 22 | 368 | 5.55 | 126 | 22.7 | 0.9450 |

*suspected contamination
— = not measured.

The above table shows that the catalysts of the invention are effective for polymerization.

We claim:

1. A catalyst comprising the reaction product of an alcohol having the general formula (I):

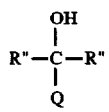

(I)

with an organometallic compound having the general formula $$LM(X)_{v-1}$$

wherein Q is —$COR^{12}$, —$CR''R''(OR^{12})$ or —$CR''R''N(R'')_2$; wherein each R" is independently selected from H and $R^{12}$, each $R^{12}$ is R or is of the formula —$(CH_2)_wO(CH_2)_y$H, w and y independently being an integer of from 1 to 4; R is a $C_1$ to $C_{20}$ alkyl group or a $C_6$ to $C_{24}$ aryl group, M is a Group 3 to 7 metal;

each X is independently selected from hydrogen, halogen or a $C_1$–$C_6$ alkyl group or a $C_6$–$C_{24}$ aryl group;

L is:

(i.) a cyclopentadienyl ring of the formula:

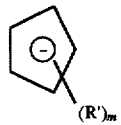

wherein each R' is either hydrogen, halogen, silylgermyl, cyano, $R_6$ or $OR_6$ wherein $R_6$ is a $C_1$ to $C_{20}$ hydrocarbyl group, or two carbon atoms are together to form a $C_4$–$C_6$ ring, and m, representing the number of substituent groups on the ring, is an integer from 1 to 5; or (ii.) a boraaryl ring containing the unit:

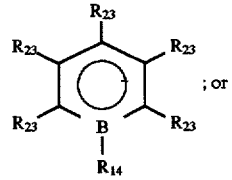

(iii.) a 1,2-azaborolinyl ring of the formula:

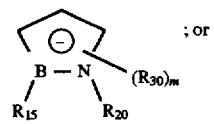

(iv.) a 5-membered heterocyclic ring of the formula:

wherein m represents the number of substituent groups on the ring;
$R_{22}$ is —R;
$R_{23}$ is $R_{22}$ or —H or two or more $R_{23}$ (wherein $R_{23}$ is $R_{22}$) form a fused ring system;
$R_{20}$ is $R_{15}$, hydrogen, halogen, COR, COOR, SOR or SOOR;
$R_{15}$ is $R_{22}$ or $Si(R)_3$;
$R_{30}$ is independently $R_{20}$, OR, $N(R)_2$, S(R) or a fused ring system;
each $R_{14}$ is selected from $R_{15}$ or $R_{10}$, $R_{10}$ being —OR or a radical of the formula:

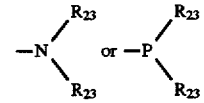

each E is nitrogen, phosphorus, arsenic, antimony or bismuth;
k is an integer from 1 to 5;
v is the valence of M; and
each $R^{16}$ is independently $R_{14}$, hydrogen, —COR, —SR, —X or —$Si(R)_3$.

2. The catalyst according to claim 1 wherein M is a Group 4, 5 or 6 metal.

3. The catalyst according to claim 2 wherein L is a cyclopentadienyl ring.

4. The catalyst according to claim 2 wherein L is a boraaryl ring.

5. The catalyst according to claim 1, wherein L is a cyclopentadienyl ring.

6. The catalyst according to claim 2, wherein M is zirconium, titanium or hafnium.

7. The catalyst according to claim 2 wherein Q is —COR$^{12}$.

8. The catalyst according to claim 2 wherein Q is —CR"R"N(R")$_2$.

9. The catalyst according to claim 2 wherein Q is —CR"R"(OR$^{12}$).

10. The catalyst according to claim 2 wherein R is a $C_1$ to $C_4$ alkyl group.

11. The catalyst according to claim 2 wherein X is chlorine.

12. The catalyst according to claim 4 wherein the boraaryl is of the formula:

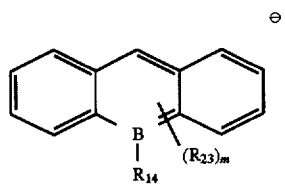

13. The catalyst according to claim 4, wherein the boraaryl ring is the formula:

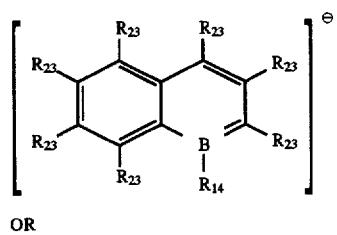

OR

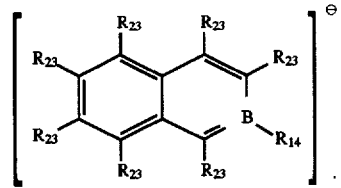

14. The catalyst according to claim 2, wherein L is a 1,2-azaborolinyl ring.

15. A method of making a catalyst according to claim 1 comprising reacting the alcohol with the organometallic compound in the presence of a base that reacts with HX which is formed when the alcohol reacts with the organometallic compound.

16. A method of polymerizing an α-olefin comprising contacting said α-olefin with the catalyst of claim 1.

17. The method of claim 16 wherein M is a Group 4, 5 or 6 metal.

18. A method according to claim 16, wherein said α-olefin is ethylene.

19. A method according to claim 16, wherein the α-olefin is contacted with the catalyst and a co-catalyst.

20. A method according to claim 19 wherein the co-catalyst is an aluminoxane.

21. The catalyst of claim 9 wherein the alcohol is of the formula

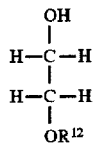

and the organometallic compound is of the formula

22. The catalyst according to claim 21 wherein R$^{12}$ is a $C_1$–$C_4$ alkyl group.

23. The catalyst of claim 8 wherein the alcohol is of the formula

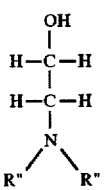

and the organometallic compound is of the formula

24. The catalyst according to claim 23 wherein L is cyclopentadienyl.

25. The catalyst of claim 7 wherein the alcohol is of the formula

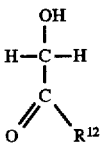

and the organometallic compound is of the formula

26. The catalyst according to claim 25 wherein L is cyclopentadienyl.

27. The catalyst according to claim 2 wherein R" and R$^{12}$ are independently selected from a $C_1$ to $C_4$ alkyl group and Q is —COR$^{12}$ or —CR"R"N(R")$_2$.

28. The catalyst according to claim 2 wherein R" and R$^{12}$ are independently selected from a $C_1$ to $C_4$ alkyl group or —(CH$_2$)$_w$O (CH$_2$)$_y$H and Q is —CR"R"OR$^{12}$.

29. A supported catalyst system comprising a catalyst support and the catalyst of claim 2.

* * * * *